(12) United States Patent
Sato et al.

(10) Patent No.: US 8,100,027 B2
(45) Date of Patent: *Jan. 24, 2012

(54) GEAR

(75) Inventors: Masanori Sato, Iwata (JP); Katsufumi Abe, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/745,014

(22) PCT Filed: Nov. 21, 2008

(86) PCT No.: PCT/JP2008/071236
§ 371 (c)(1),
(2), (4) Date: May 27, 2010

(87) PCT Pub. No.: WO2009/069554
PCT Pub. Date: Jun. 4, 2009

(65) Prior Publication Data
US 2010/0300229 A1   Dec. 2, 2010

(30) Foreign Application Priority Data

Nov. 28, 2007   (JP) .................................. 2007-307054

(51) Int. Cl.
*F16H 55/17*   (2006.01)
(52) U.S. Cl. .......................................... 74/460; 74/434
(58) Field of Classification Search ................ 74/412 R, 74/434, 454, 459.5, 460
See application file for complete search history.

(56) References Cited

U.S. PATENT DOCUMENTS

| | | | | |
|---|---|---|---|---|
| 2,279,216 A * | 4/1942 | Way | ................................ | 74/460 |
| 4,893,387 A * | 1/1990 | Akamatsu et al. | ............... | 492/37 |
| 5,064,298 A * | 11/1991 | Hibi et al. | ..................... | 384/625 |
| 5,159,852 A * | 11/1992 | Harimoto | ....................... | 74/559 |
| 5,397,188 A * | 3/1995 | Yoshizuka et al. | ............. | 384/492 |
| 6,732,606 B1* | 5/2004 | Zhu et al. | ......................... | 74/460 |
| 2003/0113051 A1* | 6/2003 | Yoshiba et al. | ................ | 384/618 |

FOREIGN PATENT DOCUMENTS

| | | |
|---|---|---|
| JP | 2591616 | 3/1999 |
| JP | 2000-280120 | 10/2000 |
| JP | 2002-031212 | 1/2002 |
| JP | 2002-130409 | 5/2002 |
| JP | 2006-225741 | 8/2006 |

OTHER PUBLICATIONS

International Search Report issued Feb. 10, 2009 in International (PCT) Application No. PCT/JP2008/071236.

* cited by examiner

*Primary Examiner* — Justin Krause
(74) *Attorney, Agent, or Firm* — Wenderoth, Lind & Ponack, L.L.P.

(57) ABSTRACT

The invention aims to improve not only the resistance to abrasion and scoring, but also the fatigue strength against pitting and chipping, without increasing the number of steps of the manufacturing process.

The tooth face 2 of the gear is smoothed by gyro polishing. In the thus smoothed tooth face 2, a multitude of microscopic recesses 3 are randomly formed by liquid honing in which microscopic hard particles are collided with the tooth surface together with liquid. By the liquid honing, a large compressive residual stress is produced on the tooth face 2. This improves not only the resistance to abrasion and scoring, but also the fatigue strength against pitting and chipping, without increasing the number of steps of the manufacturing process.

18 Claims, 4 Drawing Sheets

GEAR

TECHNICAL FIELD

This invention relates to a gear having high resistance to abrasion and scoring of the tooth face, and superior fatigue strength against pitting of the tooth surface and chipping.

BACKGROUND ART

To gears that are lubricated by splashing lubricating oil, such as gears used in motor vehicle transmissions, lubricating oil is not sufficiently supplied to their engaging portions, so that abrasion and scoring tend to develop on their tooth faces. To solve this problem, the present applicant proposed to improve the resistance to abrasion and scoring by randomly forming a multitude of microscopic recesses on the tooth face which serve to keep oil therein, thereby promoting the formation of an oil film on the tooth face (see e.g. patent document 1.).

In one specific method of randomly forming microscopic recesses in a surface of a part such as a tooth face, recesses and protrusions are first formed randomly on the surface by a special polishing method such as centrifugal fluid barreling, and then only the protrusions are flattened by barreling, thereby randomly forming microscopic recesses.

With increases in the numbers of steps in transmissions as well as increasing outputs of engines, gears used in transmissions are subjected to larger loads and rotated at higher speeds. Furthermore, for fuel economy of motor vehicles, smaller transmissions are used. Thus, smaller gears or smaller modular gears are required for use in such transmissions. For these reasons, gears used in today's transmissions tend to suffer fatigue damage such as pitting and chipping.

In order to increase the fatigue strength of machine parts such as gears, it is known to subject such parts to shot peening before finishing their surfaces by e.g. polishing, thereby producing a large compressive residual stress on the surface.
Patent Document 1: JP Utility Model Registration Publication 2591616

SUMMARY OF INVENTION

Technical Problem

The gears disclosed in the above-identified publication are resistant to abrasion and scoring, but their fatigue strength against pitting and chipping are not sufficient because no large compressive residual stress is produced on their teeth face or root. One way to improve the fatigue strength would be to subject the gears to shot peening beforehand, as practiced on conventional machine parts. But such shot peening step adds to the number of steps of the manufacturing process, thereby complicating the manufacturing process.

An object of the present invention is to improve not only the resistance to abrasion and scoring, but also the fatigue strength against pitting and chipping, without increasing the number of steps of the manufacturing process.

Solution of Problem

In order to achieve this object, the present invention provides a gear having a tooth face in which a multitude of microscopic recesses are randomly formed, characterized in that the surface in which the recesses are formed has surface roughness parameters Ryni: 2.0 to 5.5 µm, Rymax: 2.5 to 7.0 µm, and Rqni: 0.3 to 1.1 µm.

The parameter Ryni is a mean value for sampling length per maximum height, obtained by extracting only a sampling length from a roughness curve in the direction of the mean line, and measuring the spacing between the crest line and the bottom line of the extracted portion in the direction of the longitudinal magnification of the roughness curve, and the parameter Rymax is the maximum value for sampling length per maximum height (ISO 4287: 1984). The parameter Rqni is defined as a value obtained by integrating the square of the deviation of height from the roughness centerline to the roughness curve in an interval of measured length, and finding the square root of the mean value in said interval; it is also known as the root mean square roughness.

The tooth face is smoothed by polishing, and the multitude of recesses are formed by colliding microscopic hard particles against the thus smoothed tooth face. With this arrangement, by colliding the microscopic hard particles against the tooth face, a large compressive residual stress is produced on the tooth face. This improves not only the resistance to abrasion and scoring, but also the fatigue strength against pitting and chipping, without increasing the number of steps of the manufacturing process.

Preferably, after the tooth face has been smoothed by the polishing, the tooth face has a surface roughness of Ryni: 0.7 to 1.5 µm, Rymax: 0.9 to 2.5 µm, and Rqni: 0.1 to 0.3 µm.

The above polishing may be gyro polishing.

The hard particles used to form the recesses may comprise aluminum oxide as a major component, and have an external diameter of 0.1 to 1 mm.

The recesses may be formed by liquid honing.

The gear can be advantageously used in a transmission of a motor vehicle.

Effects of Invention

According to the present invention, the tooth face is smoothed by polishing, and the multitude of recesses are formed by colliding microscopic hard particles against the thus smoothed tooth face such that the surface roughness of the surface in which the recesses are formed has surface roughness parameters Ryni: 2.0 to 5.5 µm, Rymax: 2.5 to 7.0 µm, and Rqni: 0.3 to 1.1 µm. With this arrangement, by colliding the microscopic hard particles against the tooth face, a large compressive residual stress is produced on the tooth face. This improves not only the resistance to abrasion and scoring, but also the fatigue strength against pitting and chipping, without increasing the number of steps of the manufacturing process.

DESCRIPTION OF NUMERALS

Figure 1:
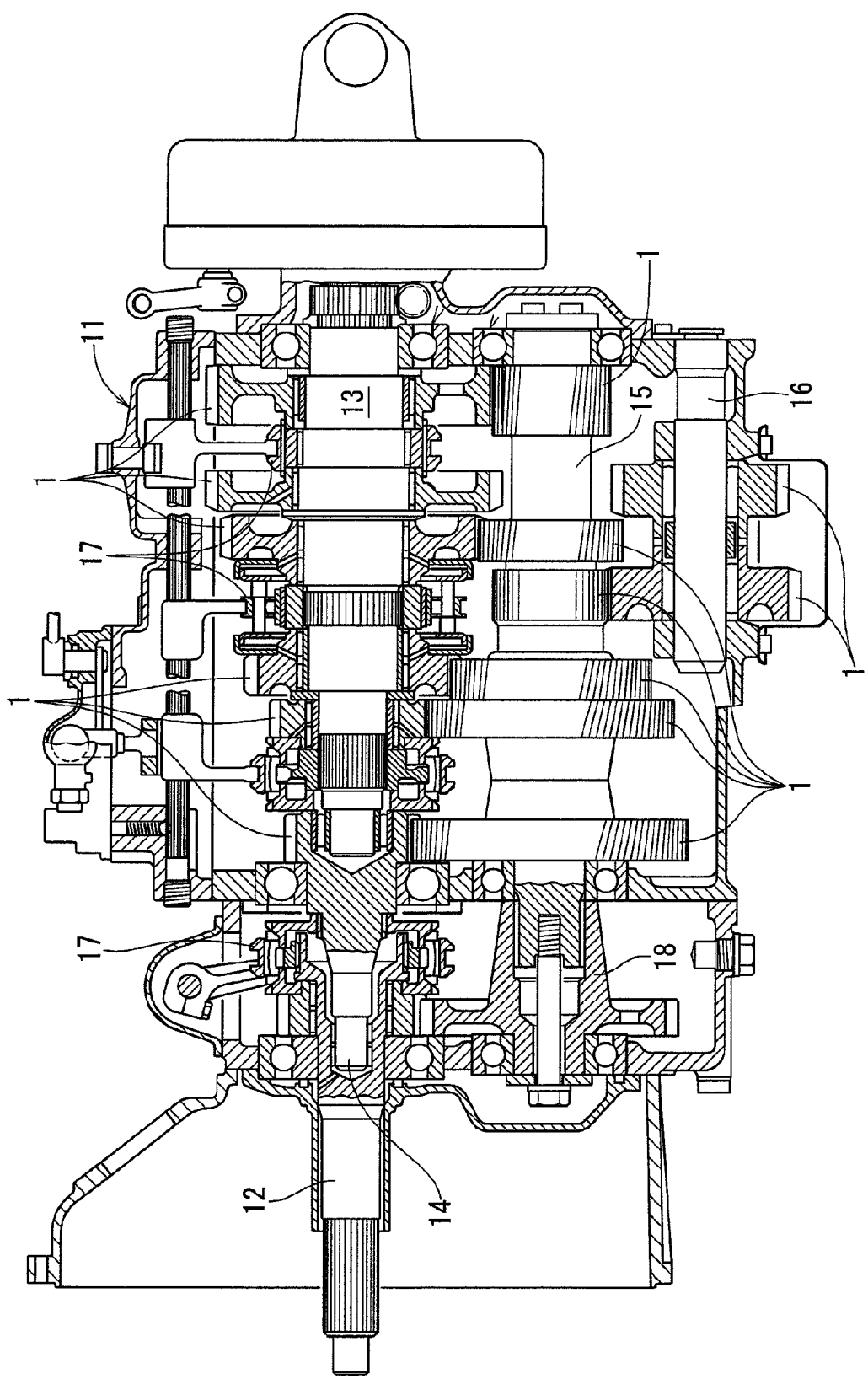
FIG. 1 is a vertical sectional view of a transmission in which gears according to the present invention are used.

1 Gear
1a, 1b, 1c Test gear
2 Tooth face
2a Tooth top
2b Tooth flank
2c Tooth bottom
3 Recess
11 Housing
12 Input shaft
13 Output shaft
14 Pilot shaft
15 Counter shaft
16 Reverse shaft
17 Clutch hub
21 Polishing tank
22 Support member
23, 24 Rotary shaft
25 Nozzle
31 Driving shaft
32 Through gear
33 Driven shaft
34 Lever
35 Weight
36 Torque meter
37 Rotary shaft
38 Stationary shaft
39 Stationary gear
40 Arm

DETAILED DESCRIPTION OF THE INVENTION

The embodiment of the present invention is now described with reference to the drawings. FIG. 1 shows an automotive transmission in which gears 1 according to the present invention are used. This transmission is a manual transmission including a housing 11, and an input shaft 12, an output shaft 13 and a pilot shaft 14 as an intermediate shaft which are mounted in the housing 11 in series with each other. The transmission further includes a countershaft 15 as an intermediate shaft and a reverse shaft 16 which are arranged parallel to the output shaft 13. For better understanding, FIG. 1 shows a developed view of the transmission. Actually, the reverse shaft 16 is also in engagement with the output shaft 13.

The gears 1 are mounted to the respective shafts 12, 13, 14, 15 and 16. By shifting clutch hubs 17 with external force, the gears 1 are selectively brought into and out of meshing engagement so that a suitable torque transmission path is selected. The gears 1 are lubricated by splashes of oil in an oil pan (not shown).

Figure 2:
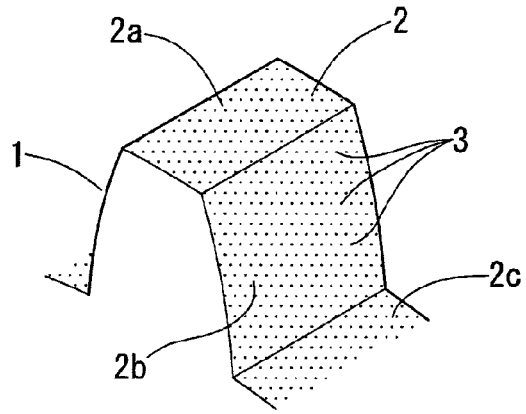
FIG. 2 is a partial perspective view of one of the gears shown in FIG. 1.

As shown in FIG. 2, a multitude of microscopic recesses 3 are formed in the tooth top 2a, tooth flank 2b and tooth bottom 2c of the tooth face 2 of each gear 1. The recesses 3 are formed by liquid honing after smoothing the tooth face 2 to the surface roughness of Ryni: 0.7 to 1.5 μm, Rymax: 0.9 to 2.5 μm, and Rqni: 0.1 to 0.3 μm by gyro polishing. With the recesses 3 formed, the gears 1 have a surface roughness of Ryni: 2.0 to 5.5 μm, Rymax: 2.5 to 7.0 μm, and Rqni: 0.3 to 1.1 μm.

Figure 3:
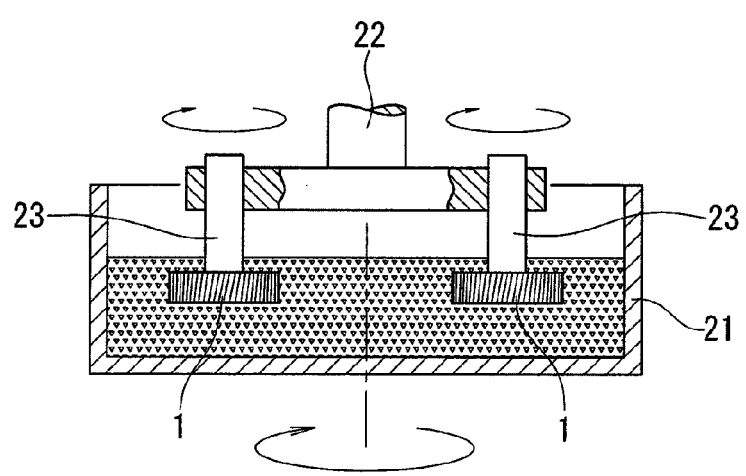
FIG. 3 is a schematic vertical sectional view of a gyro polishing machine.

The gyro polishing is carried out as follows: As shown schematically in FIG. 3, gears 1 as workpieces which are mounted to a plurality of rotary shafts 23, respectively, are inserted in a polishing tank 21 filled with a polishing medium; the rotary shafts 23 are rotated about their respective axes to rotate the gears 1; and simultaneously the polishing tank 21 or a support member 22 supporting the rotary shafts 23 is rotated about the central axis of the tank 21 or the support member 22, thereby rotating the gears 1 about the central axis of the polishing tank 21 relative to the polishing tank 21. With this arrangement, it is possible to uniformly bring the entire tooth face 2 into contact with the polishing medium, thereby smoothing the complicatedly shaped tooth face 2.

Figure 4:
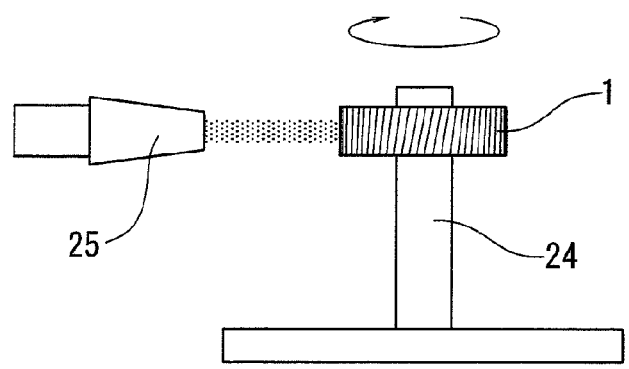
FIG. 4 is a schematic front view of a liquid honing device.

As shown schematically in FIG. 4, the liquid honing is carried out by blowing liquid containing hard particles through a nozzle 25 against the tooth face 2 of a gear 1 mounted to a rotary shaft 24 while rotating the gear 1. When the hard particles collide against the tooth face 2, the microscopic recesses 3 are formed in a random manner, and simultaneously, a large compressive residual stress is produced on the tooth face 2. In this embodiment, the hard particles comprise aluminum oxide as a major component, and have an external diameter of 0.1 to 1.0 mm.

EXAMPLES

As Example of the invention, gears were prepared having, as described above, a multitude of microscopic recesses formed randomly in the tooth face by liquid honing after smoothing the tooth face by gyro polishing. As Comparative Example, gears were prepared having a multitude of microscopic recesses formed randomly in the tooth face by centrifugal fluid barreling and barreling. The gears of Example of the invention and Comparative Example are both made of carburized medium-carbon Cr alloy steel SCr420. A pitting resistance test and a chipping resistance strength test were conducted on the gears of Example of the invention and Comparative Example. Also, for the respective gears of the Example of the invention and Comparative Example, compressive residual stress was measured near the respective tooth face.

Figure 5:
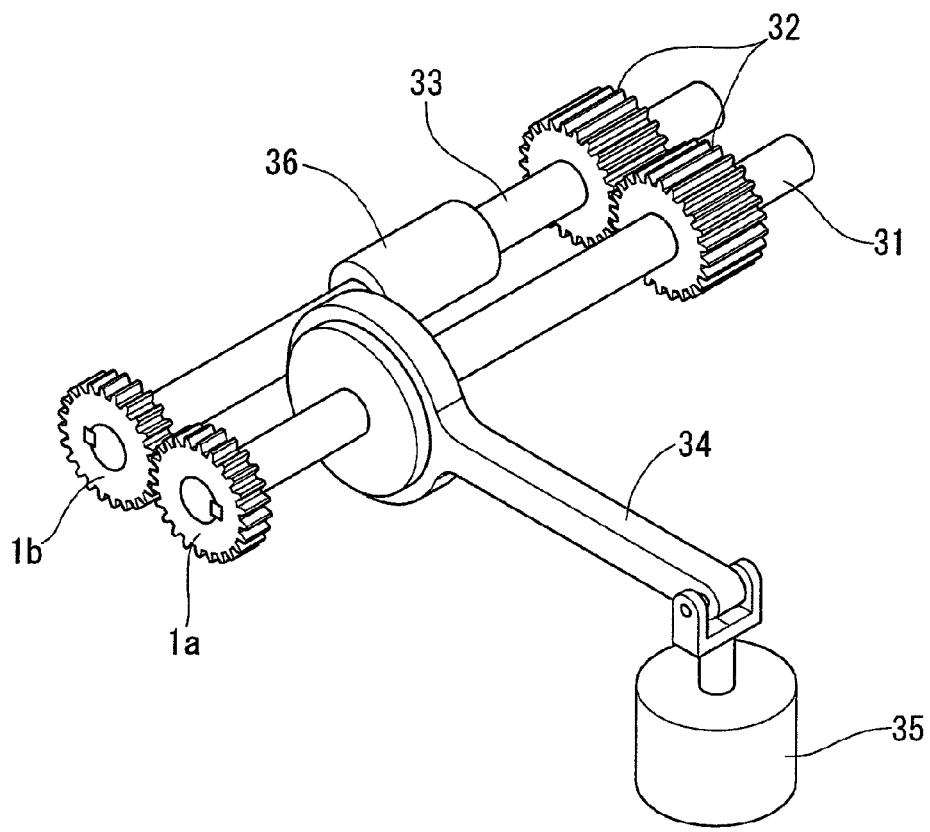
FIG. 5 is a perspective view of a spur gear fatigue tester used in a pitting resistance test.

The pitting resistance test was conducted using a spur gear fatigue tester shown in FIG. 5. This spur gear fatigue tester comprises a driving shaft 31 driven by a motor (not shown), a driven shaft 33 driven by the driving shaft 31 through gears 32 meshing with each other. Test gears 1a and 1b are mounted on the driving and driven shafts 31 and 33, respectively, so as to mesh with each other. A lever 34 carrying a weight 35 is coupled to the driving shaft 31 to apply torsional torque to the driving shaft 31 near its front end. In this state, power is circulated between the driving shaft 31 and the driven shaft 33. Torque applied is monitored by a torque meter 36 mounted on the driven shaft 33. The test was conducted under the following conditions.

Test gear on the driving side: 79 mm in external diameter, 35 mm in internal diameter, 8.2 mm wide, and having 29 teeth.
Test gear on the driven side: 79 mm in external diameter, 35 mm in internal diameter, 15 mm wide, and having 30 teeth.
Number of revolutions: 3500 rpm
Torque applied: 19 kgf·m
Lubricating oil: ATF oil (oil temperature: 80° C.)

The results of the pitting resistance test revealed that the time period until the test gears of Example of the invention suffered pitting was about nine times longer than the period until the test gears of Comparative Example suffered pitting. Thus, the test gears of Example of the invention have extremely high resistance to pitting.

Figure 6:
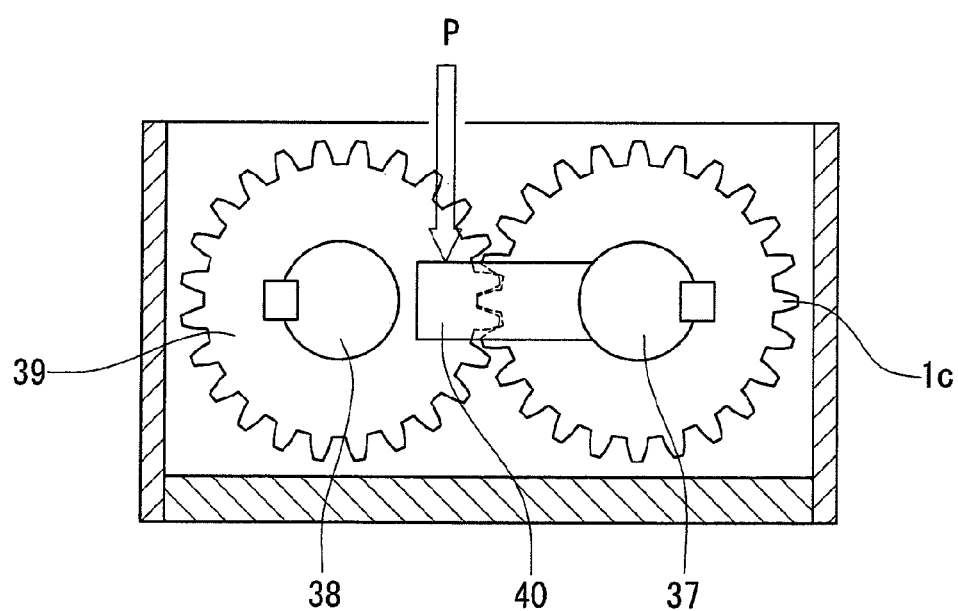
FIG. 6 is a front view schematically showing a chipping resistance strength test.

In the chipping resistance strength test, as shown in FIG. 6, a test gear 1c mounted on a rotary shaft 37 is meshed with a stationary gear 39 mounted on a stationary shaft 38, and load P is repeatedly applied to an arm 40 secured to the rotary shaft 37, thereby repeatedly applying bending stress to the root of the test gear 1c. The intensity of the repeatedly applied load P was changed to determine the fatigue limit point, i.e. the bending stress at the root of the gear when the gear suffered chipping.

Figure 7:
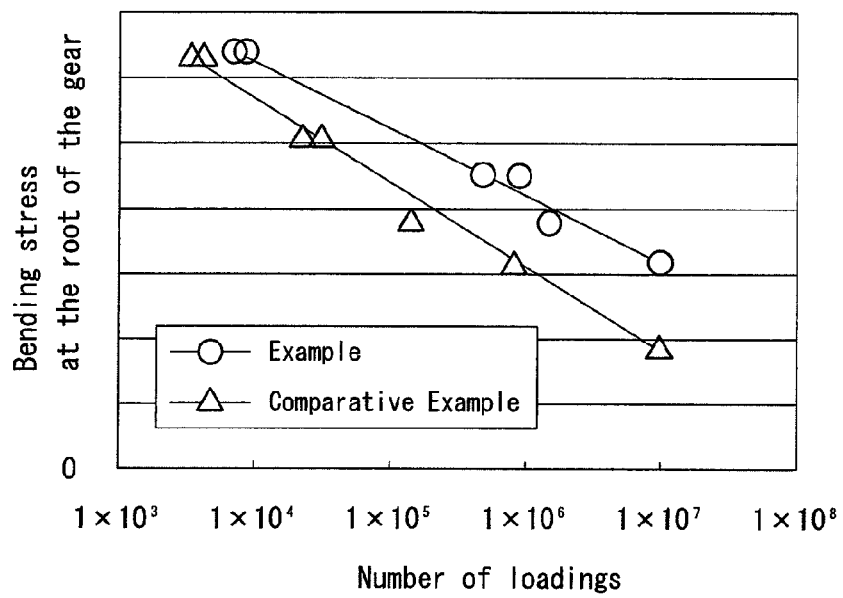
FIG. 7 is a graph showing the results of the chipping resistance strength test.

FIG. 7 shows the results of the chipping resistance strength test. The test results show that the test gears of Example of the invention have far higher fatigue limit point at which the gears suffer chipping. Where the bending stress at the root of the gear was in a practical low range, the fatigue limit point improved by about 50%.

Figure 8:
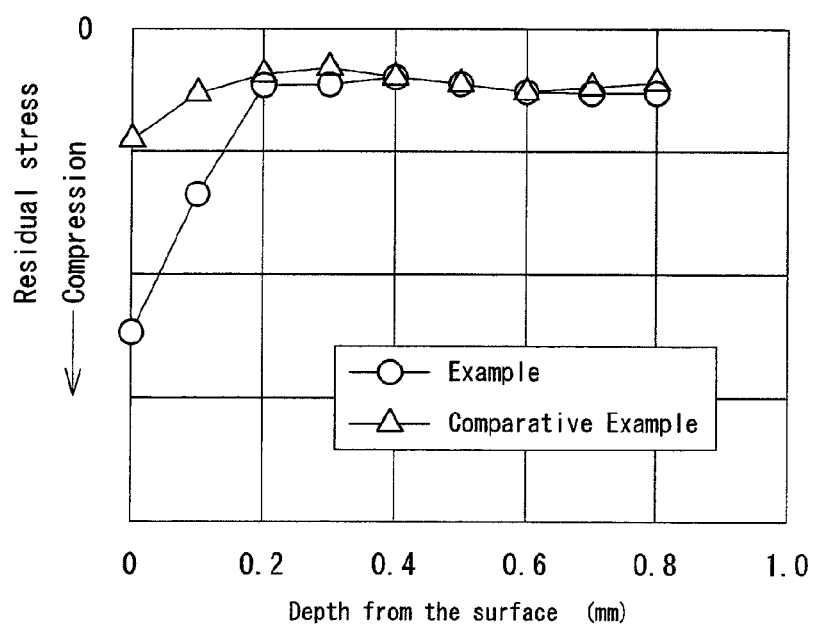
FIG. 8 is a graph showing the measurement results of compressive residual stress near the tooth face.

FIG. 8 shows the compressive residual stress values as measured near the tooth face of the gears of Example of the invention and Comparative Example. For either of the gears of Example of the invention and Comparative Example, small compressive residual stress was produced near the tooth face, which is considered to result from heat treatment. For the gears of Example of the invention, besides such small compressive residual stress, a large compressive residual stress which is considered to result from liquid honing is present in the surface layer to the depth of 0.2 mm from the surface. It is considered that this large compressive residual stress contributes to the differences in the pitting resistance and chipping resistance in the pitting resistance test and the chipping resistance strength test between the gears of Example of the invention and the gears of Comparative Example.

In the embodiment, before forming the recesses, the tooth face is polished by gyro polishing. But instead, the tooth face may be polished by a different method such as barreling. Also in the embodiment, the recesses are formed by liquid honing. But as far as the recesses are formed by colliding microscopic hard particles with the tooth face, a different method may be used, such as shot peening.

The invention claimed is:

1. A gear having a tooth face in which a multitude of microscopic recesses are randomly formed, wherein a surface of said tooth face in which said recesses are formed has surface roughness parameters Ryni: 2.0 to 5.5 μm, Rymax: 2.5 to 7.0 μm, and Rqni: 0.3 to 1.1 μm.

2. The gear of claim 1, wherein said tooth face is smoothed by polishing, and wherein said multitude of recesses are formed by colliding microscopic particles against the smoothed tooth face.

3. The gear of claim 2, wherein said polishing is gyro polishing.

4. The gear of claim 3, wherein the particles used to form said recesses comprise aluminum oxide as a component, and have an external diameter of 0.1 to 1 mm.

5. The gear of claim 3, wherein said recesses are formed by liquid honing.

6. The gear of claim 3, wherein the gear is used in a transmission of a motor vehicle.

7. The gear of claim 2, wherein the particles used to form said recesses comprise aluminum oxide as a component, and have an external diameter of 0.1 to 1 mm.

8. The gear of claim 7, wherein said recesses are formed by liquid honing.

9. The gear of claim 7, wherein the gear is used in a transmission of a motor vehicle.

10. The gear of claim 2, wherein said recesses are formed by liquid honing.

11. The gear of claim 10, wherein the gear is used in a transmission of a motor vehicle.

12. The gear of claim 2, wherein the gear is used in a transmission of a motor vehicle.

13. The gear of claim 1, wherein the gear is used in a transmission of a motor vehicle.

14. The gear of claim 2, wherein after the tooth face has been smoothed by said polishing, the smoothed tooth face has a surface roughness of Ryni: 0.7 to 1.5 μm, Rymax: 0.9 to 2.5 μm, and Rqni: 0.1 to 0.3 μm.

15. The gear of claim 14, wherein said polishing is gyro polishing.

16. The gear of claim 14, wherein the particles used to form said recesses comprise aluminum oxide as a component, and have an external diameter of 0.1 to 1 mm.

17. The gear of claim 14, wherein said recesses are formed by liquid honing.

18. The gear of claim 14, wherein the gear is used in a transmission of a motor vehicle.

* * * * *